United States Patent [19]

Deitz

[11] Patent Number: 4,695,561

[45] Date of Patent: Sep. 22, 1987

[54] CHEMICALLY IMPREGNATED IN SITU REGENERATION OF THE EFFICIENCY OF ACTIVATED CARBON FILTERS FOR TRAPPING RADIOACTIVE IODINE

[76] Inventor: Victor R. Deitz, 3310 Winnett Rd., Chevy Chase, Md. 20815

[21] Appl. No.: 709,389

[22] Filed: Mar. 7, 1985

Related U.S. Application Data

[63] Continuation-in-part of Ser. No. 506,790, Jun. 22, 1983, Pat. No. 4,518,562.

[51] Int. Cl.$^4$ .............................................. B01J 20/22
[52] U.S. Cl. .................................... 502/401; 376/313; 376/314; 55/71; 55/74; 252/630
[58] Field of Search ................ 544/351, 185; 502/401, 502/167; 55/71, 74; 252/626, 630; 376/313, 314; 546/133

[56] References Cited

U.S. PATENT DOCUMENTS 3,371,110  2/1968  Hamilton et al. ............... 544/351 X
3,453,807  7/1969  Taylor ..................................... 55/74

Primary Examiner—John F. Terapane
Assistant Examiner—John S. Maples

[57] ABSTRACT

A compound for chemically impregnating an activated charcoal bed for efficiently removing radioactive iodine from air flow from an area through a chemically impregnated carbon filter in a nuclear air cleaning system in which the compound is selected from Quinuclidine.CH$_3$I; Triethylenediamine.2CH$_3$I; and Hexamethylenetetramine.CH$_3$I.

2 Claims, No Drawings

CHEMICALLY IMPREGNATED IN SITU REGENERATION OF THE EFFICIENCY OF ACTIVATED CARBON FILTERS FOR TRAPPING RADIOACTIVE IODINE

RELATED APPLICATION

This application is a continuation in-part of application Ser. No. 506,790 filed on June 22, 1983, now U.S. Pat. No. 4,518,562.

This invention is directed to chemically impregnated nuclear-grade activated carbons used for trapping radioactive iodine and more particularly to a method of regenerating chemically impregnated nuclear-grade activated carbon in place.

The technology of activated carbons in air-cleaning application to the nuclear industry differs in two important respects from other activated carbon applications. First, a nuclear-grade activated carbon filter is used continuously for an extended period of time and must reduce the iodine-131 concentration to a safe level at any point in time, including an accident mode. Second, the exhausted carbon is not regenerated as in non-nuclear applications, and this seriously influences the economy of the nuclear application.

The activated carbons for use in nuclear power plants are impregnated with one of several formulations in order to increase the efficiency of the adsorbent for trapping radioactive methyliodide-131. There are presently three types of impregnant materials used in commerce for the above purpose: potassium iodide (KI), selected tertiary amines such as triethylenediamine (TEDA), and the co-impregnation of KI and a tertiary amine. The useful life of activated carbon filters in the ventilation systems of nuclear power stations is slowly impaired by the contaminants contained in the large volume of process air and the above commercial impregnated carbons now in use have a limited life. Moreover, they cannot be regenerated. During service in nuclear power installations, the carbon filters are contacted with the ubiquitous air pollutants such as sulphur dioxide, nitrogen oxides, and ozone; other species known to be present are the volatile hydrocarbons and water vapor. As a result of the exposure, the carbon is progressively degraded in its efficiency to remove the test gas, radioactive methyliodide-131, and eventually the activated carbon must be replaced.

Sizable quantities of contaminants enter a carbon filter. For example, an air flow of 30,000 cfm for 90 days through a filter containing approximately 3,750 pounds of activated carbon (2-inch depth) can introduce the contaminants listed in Table 1. Accordingly, for a design life of 30 months, considerable quantities of contaminant can accumulate in the carbon filter.

TABLE 1

| Some Contaminants Passing Into a 30,000 cfm Filter | | |
|---|---|---|
| Concentration ppm (V/V) 3-Year AV. | Weight in 90 Days (lbs.) | Wt. % of Charcoal |
| Ozone 0.019 | 10 | 0.27 |
| $SO_2$ 0.023 | 16 | 0.43 |
| Hydrocarbons (non-$CH_4$) 0.23 | 214 (Hexane) | 5 |

It has been determined that the commercial nuclear carbons are degraded by the atmospheric contaminants and the behavior was similar at three different exposure sites which has been set forth in "Effects of Weathering on Impregnated Charcoal Performance," NUREG/CR-2112 and NRL MEMO Report 4516, September 1981. The penetration of methyliodide-131 is generally considered as a measure of carbon-filter performance. The penetration rises rapidly in air flows greater than 70% relative humidity, and the degradation correlates best with the dew point of the air flow.

The common air contaminants (ozone, sulfur dioxide, nitrogen oxides, and hydrocarbons) adversely influence the inlet layer of carbon in a filter bed, and these contaminants then migrate to lower depths with increase of length of service. Vapors from solvent spills and organic vapors from plant operations contribute to the degradation more strongly at higher humidities than at lower humidities.

Pertinent to this invention, it has been determined that weathered carbons cannot be regenerated at ambient temperature by a continued air purge.

It has been determined that chemically impregnated charcoals, weathered to a degree wherein they are no longer useful, could be completely regenerated by exposure to suitable radiation facilities.

Second, it has been determined that the adsorption of nonradioactive methyliodide-127 was improved to a very small extent. This fact eliminated the possibility that the irradiation had regenerated gas adsorption sites on the charcoal. However, since the trapping of the radioactive species, methyliodide-131, had been realized after irradiation, it has been established that the improvement is due to the activation of the isotope exchange capacity of the chemically impregnated carbon.

Third, it has been determined that certain chemical compounds when added to the gas flow entering the carbon filter will regenerate the exchange capacity of exhausted chemically impregnated carbons. These observations establish the feasibility of restoring in situ the iodine-131 trapping of a chemically impregnated activated carbon bed. The improvement by radiation is thus attributable to chemical changes brought about during the radiolysis of the impurities on chemically impregnated service carbons.

This invention relates to an indefinite extension of the productive life of an activated carbon filter by improved chemically impregnating the carbon and by introducinng controlled quantities of chemical reducing agents into the air flow entering the carbon filter. There are three direct advantages to be gained: 1) saving in the new impregnated carbon required to replace exhausted material, 2) the savings in skilled labor required to replace the carbon and in the cost of waste burial, and 3) the assurance that a carbon filter is ready at any point in time to meet the requirements of Regulatory Guide 1.52 of the U.S. Nuclear Regulatory Commission.

In making this invention, it was observed that a number of improved chemically impregnated carbons could be reactivated by exposure to high-level radiation to trap radioactive methyliodide-131. One experiment using radiation exposures on the LINAC (Linear Accelerator) on commercial types of chemically impregnated carbon is summarized in Table 2.

TABLE 2

Penetration of Methyliodide-131 Before and After Linac Exposure of $10^9$ RADS (10-11 AUGUST 1981)

| Sample | Weight (g) | % Penetration Initial | % Penetration Radiated |
|---|---|---|---|
| 1 | 160 | 30.1 | 0.039 |
| 2 | 147 | 10.5 | 0.033 |
| 3 | 143 | 9.99 | 0.03 |
| 4 | 141 | 38.9 | 0.002 |

Sample 1 (Table 2) had been used for two years in glove-box operations with iodine-125 for the preparation of organic compounds used in medical treatments. Sample 2 had been similarly used for one year. Sample 3 had been weathered in a flow of outdoor air ($1.05 \times 10^8$ cubic feet) for 0.77 year. Sample 4 was weathered similarly for 2.07 years. The recovery of carbon efficiency for trapping methyliodide-131 was outstanding in all cases as shown by the low penetration for the irradiated samples.

It has also been determined that exposures made to the gamma radiation from Co-60 at lower radiation levels, also increased the efficiency for the trapping of methyliodide-131 (see Table 3).

TABLE 3

Penetration Before and After Co—60 Irradiation To Accumulated Levels of $10^7$ and $10^8$ RADS

| Sample | % PENETRATION OF METHYLIODIDE-131* Original | $10^7$ RADS | $10^8$ RADS |
|---|---|---|---|
| 5 | 31.0 | 16.4 | 6.31 |
| 1 | 30.1 | 11.7 | 7.25 |

*Standard Test ASTM/ANSI D3803-79

This entailed measurements of the adsorption properties of the irradiated carbon samples. The penetration of non-radioactive methyliodide-127 (MeI-127) was determined for many of the above carbon samples before and after the irradiation. The results for two of the samples are given in Table 4.

TABLE 4

Penetration of Methyliodide-127 and Methyliodide-131 for Service Carbons

| Sample | % PENETRATION MeI-127 | MeI-131 |
|---|---|---|
| 1, Original Used Carbon | 92 | 30.1 |
| 1, Irradiated ($10^9$ Rads) | 87 | 0.03 |
| 2, Original Used Carbon | 138 | 10.5 |
| 2, Irradiated ($10^7$ Rads) | 103 | 1.9 |

The samples were coconut-shell charcoals in which the original co-impregnation was potassium iodide and a tertiary amine. Sample 1 was irradiated on the LINAC to an accumulation of $10^7$ rads.

The results (Table 4) demonstrate a great disparity between the behavior of the radioactive and non-radioactive species. It was apparent that the capacity for iodine isotope exchange has been vastly improved by the radiation exposure and that for adsorption was only slightly influenced or not at all.

High-energy radiation reacts with organic solids by processes known as radiolysis in which complex chemical decomposition reactions take place. By this invention, it has been determined that certain chemical reducing compounds, added to the gas flow to a spent improved chemically impregnated carbon, will likewise regenerate the iodine exchange capacity of the exhausted chemically impregnated nuclear-grade carbon.

In other words, the same regeneration can be accomplished either by the exposure to high-energy radiation or to the chemical reaction with a volatile reducing agent introduced into the air flow. The latter process is by far the one preferred and can readily be accomplished at ambient temperature and in existing environments.

Detailed studies of the atmospheric weathering process reveals many complex changes within a nuclear grade carbon. It is instructive to observe the penetration of radioactive methyliodide-131 after a pertinent and specific compound is adsorbed on the activated carbon before and after radiation and before and after chemical reduction under ambient conditions. One such compound is potassium iodidate ($KIO_3$). A result of the atmospheric degradation of a potassium iodide (KI) impregnated carbon is the oxidation of the iodide ion by atmospheric ozone. The iodide ion is converted to iodate ion, wherein the iodine is surrounded by three oxygen groups to which it is chemically combined. The iodine isotope exchange between $Na^{131}I$ and $Na^{127}IO_3$ in neutral solution is almost not measurable after a contact of 1,600 hours (estimated exchange half time greater than $5 \times 10^5$ hour). One can infer that once the iodide ion on activated carbon is oxidized, to iodate ion, the product would be quite resistant to iodine isotope exchange.

In order to identify this specific aspect, a coconut-shell charcoal ($8 \times 16$ mesh) was impregnated with potassium iodate (analytical grade) in aqueous solutions and the concentration adjusted to realize 2 wt. % $KIO_3$ on the weight of the activated carbon. The trapping of radioactive methyliodide-131 was determined before and after exposure to the LINAC radiation $10^8$ rads and before and after treatment with hydrazine, a volatile chemical-reducing agent. The adsorption of non-radioactive methyliodide-127 was also determined under similar conditions using an electron capture detector of high sensitivity.

TABLE 5

Penetration of Methyliodide (MeI) Through a New Coconut Carbon Impregnated (2 wt. %) With $KIO_3$

| Exposure | Test Gas | % Penetration |
|---|---|---|
| Original | MeI-131 | 6.0 |
| LINAC at $10^8$ Rads | MeI-131 | 0.13 |
| Chemical Treatment | MeI-131 | 0.3 |

The results (Table 5) show that both chemical treatment and radiation are successful in restoring the high efficiency of the carbon for trapping radioactive methyliodide-131.

Other carbons removed from service were treated with diluted hydrazine vapors in air with quite satisfactory results. Some examples are as follows:

| Percent Penetration $CH_3I$-131 | |
|---|---|
| Original | Treated |
| 31 | 2.8 |
| 10 | 1.8 |
| 27.1 | 3.1 |
| 34.0 | 3.9 |

Ozone is, therefore, one of the atmospheric contaminants that chemically degrade nuclear-grade carbons. The stoichiometry in a weak alkali solution is:

$$3 O_3 + I^- \rightarrow 3 O_2 + IO_3^-.$$

If the same reaction takes place on a KI impregnated carbon, one would expect to find $KIO_3$ in the weathered carbon.

The chemical reduction of $KIO_3$ in solution by hydrazine is as follows:

$$N_2H_4 + 3N_2H_4 \rightarrow 3N_2 + 2KI + 6H_2O.$$

If the same reaction takes place on the weathered carbon, the formation of KI can readily be detected as shown above by iodine isotope exchange.

It has been determined that hydrazine and its derivatives as reducing agents are useful in the chemical reduction of specific groups absorbed on charcoal. Among the hydrazine derivatives used are:

Dihydrazine Sulfate—$(N_2H_4) 2H_2SO_4$
Hydrazine Hydrochloride—$(N_2H_4) HCl$
Hydrazine Hydrobromide—$(N_2H_4) HBr$
Monomethyl Hydrazine—$(CH_3NH) NH_2$
Dimethyl Hydrazine—$(CH_3)_2N NH_2$ Although there are a large number of reactions of hydrazine with many organic functional groups in the preparation of mono-, di-, tri-, and tetra-alkyl hydrazines, only those which are sufficiently volatile to be airborne either as a vapor or as an aerosol and thus be transferred to a carbon bed are useful in this invention.

It has been determined that new commercial carbons containing a KI impregnation were not influenced by either radiation or chemical reducing agents. A new activated carbon having both KI and TEDA impregnations has at least three independent mechanisms for trapping radioactive iodine:

1. adsorption of the compound to the carbon network of the carbon,
2. iodine isotope exchange, and
3. chemical combination of the iodine with the tertiary amine.

For new carbons all three mechanisms are at peak performance, and it is not possible to distinguish readily among them. However, as the carbon is weathered, each mechanism is subject to its characteristic degradation process or processes. The present results show that any process that maintains efficient isotope exchange is greatly to be desired, since the bottom line in the nuclear application is a retention of radioactive iodine by the carbon bed.

In this invention, the chemically impregnated carbons for filters have been improved in which tertiary amines form crystalline addition compounds with alkyl iodides and their chemical properties are significantly different than the amine itself. The compounds in Table 6 have been made and are presented as examples. The chemical analyses for carbon, hydrogen and nitrogen (iodine by difference from 100%) are given and compared with calculated values.

TABLE 6

| Crystalline Addition Compounds of Tertiary Amines and Methyl Iodide | | | |
|---|---|---|---|
|  | Calculated Percent | Found: | Percent |
| Triethylenediamine.$2CH_3I$ | C 24.24 | 24.29, | 24.10 |
|  | H 4.55 | 4.73, | 4.68 |
|  | N 7.07 | 7.02, | 7.05 |
| (difference) | I 64.14 | 64.07 |  |
| Hexamethylenetetraamine.$CH_3I$ | C 29.79 | 29.73 |  |
|  | H 5.32 | 5.45 |  |
|  | N 19.86 | 19.80 |  |
| (difference) | I 45.04 | 45.0 |  |
| Quinuclidine.$CH_3I$ | C 37.94 | 37.82, | 37.79 |
|  | H 6.32 | 6.82, | 6.90 |
|  | N 5.53 | 5.45, | 5.47 |

TABLE 6-continued

| Crystalline Addition Compounds of Tertiary Amines and Methyl Iodide | | | |
|---|---|---|---|
|  | Calculated Percent | Found: | Percent |
| (difference) |  | I 50.2 | 49.88 |

It has been found that the above crystalline salts are soluble in water and can be impregnated on charcoals to form very efficient materials for iodine isotope exhange. The determination of the penetration of radioactive methyliodide-131 was made by the ASTM D-3803 test procedure. Some typical results are given in the second column of Table 7 in which the base charcoal was an activated coconut shell charcoal.

TABLE 7

| Penetration of Methyl Iodide-131 | |
|---|---|
| Addition Compound | Penetration Percent |
| Triethylenediamine.$2CH_3I$ | 0.38 |
| Quinuclidine.$CH_3I$ | 0.38 |
| Triethylenediamine.$2CH_3I$ | 0.43 |
| Triethylenediamine.$2CH_3I$ | 0.03 |
| Triethylenediamine.$2CH_3I$ | 0.01 |
| Quinuclidine.$CH_3I$ | 0.08 |
| Quinuclidine.$CH_3I$ | 0.04 |
| Hexamethylenetetraamine.$CH_3I$ | 0.23 |
| Hexamethylenetetraamine.$CH_3I$ | 0.47 |

The above results are for independent preparations using three different sources for the coconut shell charcoals. Equivalent impregnations can be made using coal-base charcoals.

The above impregnations of the tetraalkylammonium iodides can be efficiently regenerated by hydrazine after the charcoal was degraded by the contaminants of the air.

In carrying out this invention for regenerating an activated chemically impregnated carbon filter in situ, a controlled quantity of the chemical reducing agent is introduced into the air flow at a suitable place in the duct work from the nuclear containment space and which is then directed through the carbon filter for a period of time from about 20 minutes to about six hours. Ambient temperatures up to 50° C. can be used. An aerosol of about 1 to 20 microns in size may be used. Low concentrations of hydrazine can be used for longer periods because of the accumulation effect in the chemically impregnated activated carbon. It is preferred to carry out the treatment at intermittent intervals (up to six months) so that the chemically impregnated activated carbon does not degrade excessively between treatments and thus require less reducing agent.

The hydrazine concentrations can be kept low ( 100 ppm) and it has been determined that the hydrazine, not reacting with the contaminant, will decompose during the passage through the carbon bed so the the effluent contains no hydrazine. The reaction products consist of nitrogen and water vapor.

The chemical reducing agent reduces the oxidized impregnant, for example, to KI originally on the charcoal, so that it is restored to the original noncontaminated state. It has been determined that suitable chemical reducing agents are those which are sufficiently volatile to be airborne either as a vapor or an aerosol so that they can be conducted by the air flow via the duct work between the reactor containment space and the carbon filter. Suitable chemical reducing agents are hydrazine and its derivatives and hydroxylamine and its derivatives.

I claim:

1. An activated charcoal filter impregnated with a compound selected from Quinuclidine.$CH_3I$; Triethylenediamine. $2CH_3I$; and Hexamethylenetetramine.$CH_3I$ for efficiently removing radioactive iodine from an air flow directed through said impregnated filter.

2. An activated charcoal filter as set forth in claim 1 wherein said compound is Triethylenediamine.$2CH_3I$.

* * * * *